United States Patent [19]
Sensui

[11] Patent Number: 6,128,444
[45] Date of Patent: Oct. 3, 2000

[54] MULTIPOINT FOCUS DETECTING APPARATUS

[75] Inventor: Takayuki Sensui, Tokyo, Japan

[73] Assignee: Asahi Kogaku Kogyo Kabushiki Kaisha, Tokyo, Japan

[21] Appl. No.: 09/351,624

[22] Filed: Jul. 12, 1999

[30] Foreign Application Priority Data

Jul. 13, 1998 [JP] Japan .................................. 10-196984
Jul. 13, 1998 [JP] Japan .................................. 10-196986

[51] Int. Cl.$^7$ .................................................. G03B 13/36
[52] U.S. Cl. ............................................ 396/114; 396/121
[58] Field of Search ..................................... 396/111, 114, 396/121, 122, 123; 250/201.2, 201.7, 201.8

[56] References Cited

U.S. PATENT DOCUMENTS

| | | | |
|---|---|---|---|
| 5,321,248 | 6/1994 | Sensui | 250/201.8 |
| 5,397,887 | 3/1995 | Sensui | 250/201.8 |
| 5,420,438 | 5/1995 | Sensui et al. | 250/201.8 |
| 5,530,236 | 6/1996 | Sensui | 250/201.8 |
| 5,646,393 | 7/1997 | Sensui | 250/201.8 |
| 5,692,222 | 11/1997 | Yamada et al. | 396/121 |

*Primary Examiner*—W. B. Perkey
*Attorney, Agent, or Firm*—Greenblum & Bernstein, P.L.C.

[57] ABSTRACT

Disclosed is a multipoint focus detecting apparatus having a plurality of focus detecting zones arranged in a first pattern on a predetermined focal plane around the center thereof, and a corresponding plurality of light receiving elements arranged in a second pattern that is different from the first pattern, a corresponding plurality of light beams which are passed through the plurality of focus detecting zones being made incident on the plurality of light receiving elements, respectively. The plurality of focus detecting zones includes a first focus detecting zone and a second focus detecting zone positioned farther from the center of the predetermined focal plane than the first focus detecting zone. The multipoint focus detecting apparatus includes: a first reflecting member for reflecting a first light beam and a second light beam which are respectively passed through the first focus detecting zone and the second focus detecting zone in directions towards an approximate center of the multipoint focus detecting apparatus; and a second reflecting member for reflecting the first and second light beams reflected by the first reflecting member towards corresponding one and another of the plurality of light receiving elements, respectively. The first reflecting member is positioned at an angle relative to the predetermined focal plane by an angle of more than 45 degrees, and equal to or less than 70 degrees.

19 Claims, 4 Drawing Sheets

MULTIPOINT FOCUS DETECTING APPARATUS

BACKGROUND OF THE INVENTION

1. Field of the Invention

The present invention relates to a multipoint focus detecting apparatus for an optical instrument such as an SLR camera.

2. Description of the Prior Art

In recent years, SLR cameras provided with a multipoint focus detecting unit for determining a focus state (defocus) at each of a plurality of focus detection zones (focusing points) have been developed. In the optical system of a conventional multipoint focus detecting unit, other than the central focus detection zone arranged over the optical axis, one or more off-center focus detection zones are arranged away from the optical axis, and light beams of an object image which are passed through the center and off-center optical axes are respectively deflected by corresponding mirrors to be incident on corresponding light receiving elements arranged in a horizontal line. For instance, a light beam of an object image which is passed through the horizontally-elongated central focus detection zone is deflected once by a mirror to be focused on a corresponding horizontally-elongated light receiving element, while another light beam of the object image which is passed through a vertically-elongated off-center focus detection zone is deflected twice by two mirrors to be focused on a corresponding horizontally-elongated light receiving element.

According to such arrangement, the light beams which are respectively passed through the center and off-center focus detection zones need to be independently deflected and guided to a corresponding light receiving element. Accordingly, it is necessary to increase the number of the mirrors or the size thereof as the number of the off-center focus detection zones increases. However, in the case where large mirrors are used, there is a possibility of the mirrors intercepting an optical path in the multipoint focus detecting unit. In the case of using a large number of mirrors, it is difficult to arrange the mirrors so as not to intercept each other while avoid intercepting the optical path in the multipoint focus detecting unit. Furthermore, since the light beams, which are respectively passed through the center and off-center focus detection zones, travel so close to each other, there is a possibility of each of the light beams being intercepted by an optical system provided for leading another light beam to the corresponding light receiving element thereof.

SUMMARY OF THE INVENTION

The primary object of the present invention is to provide a multipoint focus detecting apparatus having a structure which makes it possible to easily increase the number of focus detection zones without having any of the aforementioned problems.

To achieve the object mentioned above, according to an aspect of the present invention, there is provided a multipoint focus detecting apparatus having a plurality of focus detecting zones arranged in a first pattern on a predetermined focal plane around the center thereof, and a corresponding plurality of light receiving elements arranged in a second pattern that is different from the first pattern, a corresponding plurality of light beams which are passed through the plurality of focus detecting zones being made incident on the plurality of light receiving elements, respectively. The plurality of focus detecting zones includes a first focus detecting zone and a second focus detecting zone positioned, on the same side as said first focusing detecting zone, farther from the center of the predetermined focal plane than the first focus detecting zone. The multipoint focus detecting apparatus includes: a first reflecting member for reflecting a first light beam and a second light beam which are respectively passed through the first focus detecting zone and the second focus detecting zone in directions towards an approximate center of said predetermined focal plane; and a second reflecting member for reflecting the first and second light beams reflected by the first reflecting member towards corresponding one and another of the plurality of light receiving elements, respectively. The first reflecting member is positioned at an angle relative to the predetermined focal plane by an angle of more than 45 degrees, and equal to or less than 70 degrees.

According to another aspect of the present invention, there is provided a multipoint focus detecting apparatus having a plurality of focus detecting zones arranged in a first pattern on a predetermined focal plane around the center thereof, and a corresponding plurality of light receiving elements arranged in a second pattern that is different from the first pattern, a corresponding plurality of light beams which are passed through the plurality of focus detecting zones being made incident on the plurality of light receiving elements, respectively. The plurality of focus detecting zones includes a first focus detecting zone and a second focus detecting zone positioned, on the same side as said first focusing detecting zone, farther from the center of the predetermined focal plane than the first focus detecting zone. The multipoint focus detecting apparatus includes: a first reflecting member for reflecting a first light beam and a second light beam which are respectively passed through the first focus detecting zone and the second focus detecting zone in directions towards an approximate center of the predetermined focal plane; and a second reflecting member for reflecting the first and second light beams reflected by the first reflecting member towards corresponding one and another of the plurality of light receiving elements, respectively. The first and second light beams reflected by the first reflecting member intersect each other between the first reflecting member, and the one and another of the plurality of light receiving elements. Preferably, at least one deflection optical member is positioned so that the first and second light beams reflected by the first reflecting member intersect each other to be subsequently incident on the second reflecting member.

In both of the above arrangements, it is preferable for at least one deflection optical member to be further included, for deflecting the first light beam and the second light beam, which are respectively passed through the first focus detecting zone and the second focus detecting zone, to be incident on the first reflecting member.

In both of the above arrangements, it is preferable for at least one deflection member to include a first deflection optical member for deflecting the first light beam, which is passed through the first focus detecting zone, in a direction to approach the second light beam, which is passed through the second focus detecting zone, to be incident on the first reflecting member; and wherein the at least one deflection member includes a second deflection optical member for deflecting the second light beam, which is passed through the second focus detecting zone, in a direction to approach the first light beam, which is passed through the first focus detecting zone, to be incident on the first reflecting member.

In both of the above arrangements, it is preferable for a horizontally-elongated central focus detecting zone to be further included, which is positioned over the center of the predetermined focal plane; wherein the first focus detecting zone includes right and left detecting zones positioned on the right and left sides of the central focus detecting zone; and wherein the second focus detecting zone includes rightmost and leftmost detecting zones positioned on the right side of the right focus detecting zone and the left side of the left focus detecting zone, respectively.

In both of the above arrangements, it is preferably for the first focus detecting zone and said second focus detecting zone are provided symmetrically at left and right positions with respect to said central focus detecting zone.

In both of the above arrangements, it is preferable for a first condenser lens to be further included, positioned between the predetermined focal plane and the first deflection optical member and a second condenser lens positioned between the predetermined focal plane and the second deflection optical member.

In both of the above arrangements, it is preferable for each of the first and second deflection optical members to include a prism.

In both of the above arrangements, it is preferable for each of the plurality of light receiving elements to include an array of light receiving elements.

Both of the above arrangements can be incorporated in an SLR camera.

The present disclosure relates to subject matter contained in Japanese Patent Applications Nos. 10-196984 and 10-196986 (both filed on Jul. 13, 1998) which are expressly incorporated herein by reference in their entireties.

BRIEF DESCRIPTION OF THE DRAWINGS

The present invention will be described below in detail with reference to the accompanying drawings, in which.

DESCRIPTION OF THE PREFERRED EMBODIMENT

Figure 5:
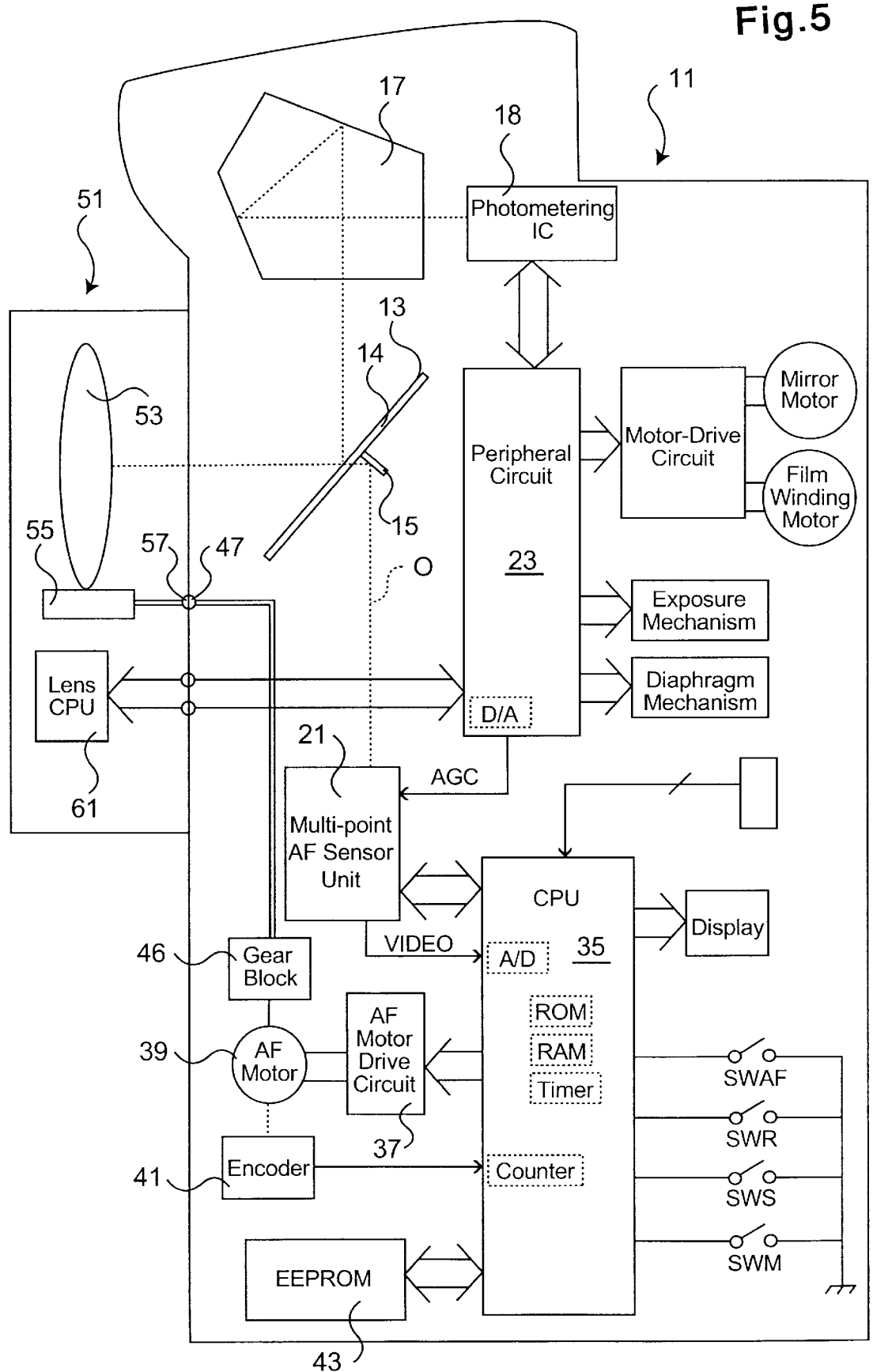
FIG. 5 is a block diagram of fundamental components of a single lens reflex camera provided with the first or second embodiment of the multipoint focus detecting apparatus to which the present invention is applied.

FIG. 5 shows a block diagram of fundamental elements of an SLR (single-lens-reflex) camera system provided with a multipoint focus detecting apparatus to which the present invention is applied. The autofocus SLR camera system includes a camera body 11 and an interchangeable photographing lens 51 detachably attached to the camera body 11. The camera body 11 is provided with a multipoint focus detecting apparatus and an autofocusing device (multipoint autofocusing system).

A major part of object light (light of an object image which is to be photographed) entering the camera body 11 through the photographing lens 51 is reflected by a main mirror (quick-return mirror) 13 toward a pentagonal prism 17, which is a fundamental element of a finder optical system in the camera body 11. Subsequently, the object light is reflected by the pentagonal prism 17 and exits out of an eyepiece. Part of the light reflected by the pentagonal prism 17 enters a light receiving element of a photometering IC 18. Part of the object light which is incident on the main mirror 13 passes through a half mirror portion 14 provided on the main mirror 13 to be reflected downwardly by an auxiliary mirror 15 provided at the rear of the main mirror 13. The light reflected downwardly by the auxiliary mirror 15 enters a multipoint AF sensor unit (multipoint focus detecting unit) 21 provided as a multipoint focus detecting apparatus. The multipoint AF sensor unit 21 is, for example, in the form of a phase difference-type of distance measuring sensor. In this particular embodiment, the multipoint AF sensor unit 21 is in the form of a phase difference-type of distance measuring sensor which includes six CCD line sensors (212A through 212F shown in FIGS. 1 and 2) corresponding to six focus detection zones (70A through 70F shown in FIG. 3).

The camera body 11 is provided with a main CPU 35 which manages the overall operations of the camera body 11. The multipoint AF sensor unit 21, a peripheral circuit 23 to which the photometering IC 18 is connected, an AF motor drive circuit 37 for driving an AF motor 39, an encoder 41, and an EEPROM 43 are provided within the camera body 11 and are all connected to the CPU 35.

The main CPU 35 calculates a defocus amount for each of the six line sensors 212A through 212F in accordance with a predetermined operation, using integral data of each of the six line sensors 212A through 212F that are input from the multipoint AF sensor unit 21. Subsequently, the main CPU 35 determines the defocus amount to be used, and the priority thereof, in accordance with all the calculated defocus amounts to determine and calculate the rotational direction and the number of revolutions of the AF motor 39 (i.e., the number of pulses to be output from the encoder 41), respectively. Thereafter, the main CPU 35 drives the AF motor 39 through the AF motor drive circuit 37 in accordance with the determined rotational direction and the calculated number of revolutions. The main CPU 35 detects and counts the pulses output from the encoder 41 in association with the rotation of the AF motor 39. When the counted number of pulses reaches the calculated number of pulses, the CPU 35 sends a signal to the AF motor drive circuit 37 to stop the AF motor 39.

Rotation of the AF motor 39 is mechanically transmitted to the photographing lens 51 through a gear block 46 and a connection between a joint 47 provided on a mount of the camera body 11 and another joint 57 provided on a corresponding mount of the photographing lens 51. The photographing lens 51 is provided therein with a lens drive mechanism 55 for mechanically transmitting the rotation of the joint 57 to an AF lens group 53, so that the AF lens group 53 is moved by the AF motor 39 via the gear block 46, the joints 47, 57 and the lens drive mechanism 55.

The main CPU 35 is provided therein with a ROM 35a in which predetermined programs are stored, a RAM 35b in which data for the calculating operation and control operation is temporarily stored, a counting reference timer 35c, a counter 35d, and an A/D converter 35e. The EEPROM 43 serving as an external memory is connected to the main CPU 35. The EEPROM 43 stores therein various inherent constants of the camera body 11 and predetermined values necessary for integration control.

A photometering switch SWS which is turned ON when a release button is depressed by a half step, and a release switch SWR which is turned ON when the release button is fully depressed, are connected to the main CPU 35. ON/OFF data of each of the photometering switch SWS and the release switch SWR is input to the main CPU 35.

The main CPU 35 functions as a controller for comprehensively controlling the operations of the camera body 11 and also the electronic parts of the photographing lens 51. The main CPU 35 constitutes an integration controller together with the multipoint AF sensor unit and the peripheral control circuit 23, and also constitutes a lens driver together with the AF motor 39.

The photographing lens 51 is provided therein with the lens drive mechanism 55 for moving the AF lens group 53 along the optical axis, and the joint 57 which can be connected to the joint 47 of the camera body 11 to mechanically transmit the rotation of the AF motor 39 to the lens drive mechanism 55. A lens CPU 61 exchanges necessary data with the main CPU when the photographic lens 51 is connected to the camera body 11.

Figure 1:
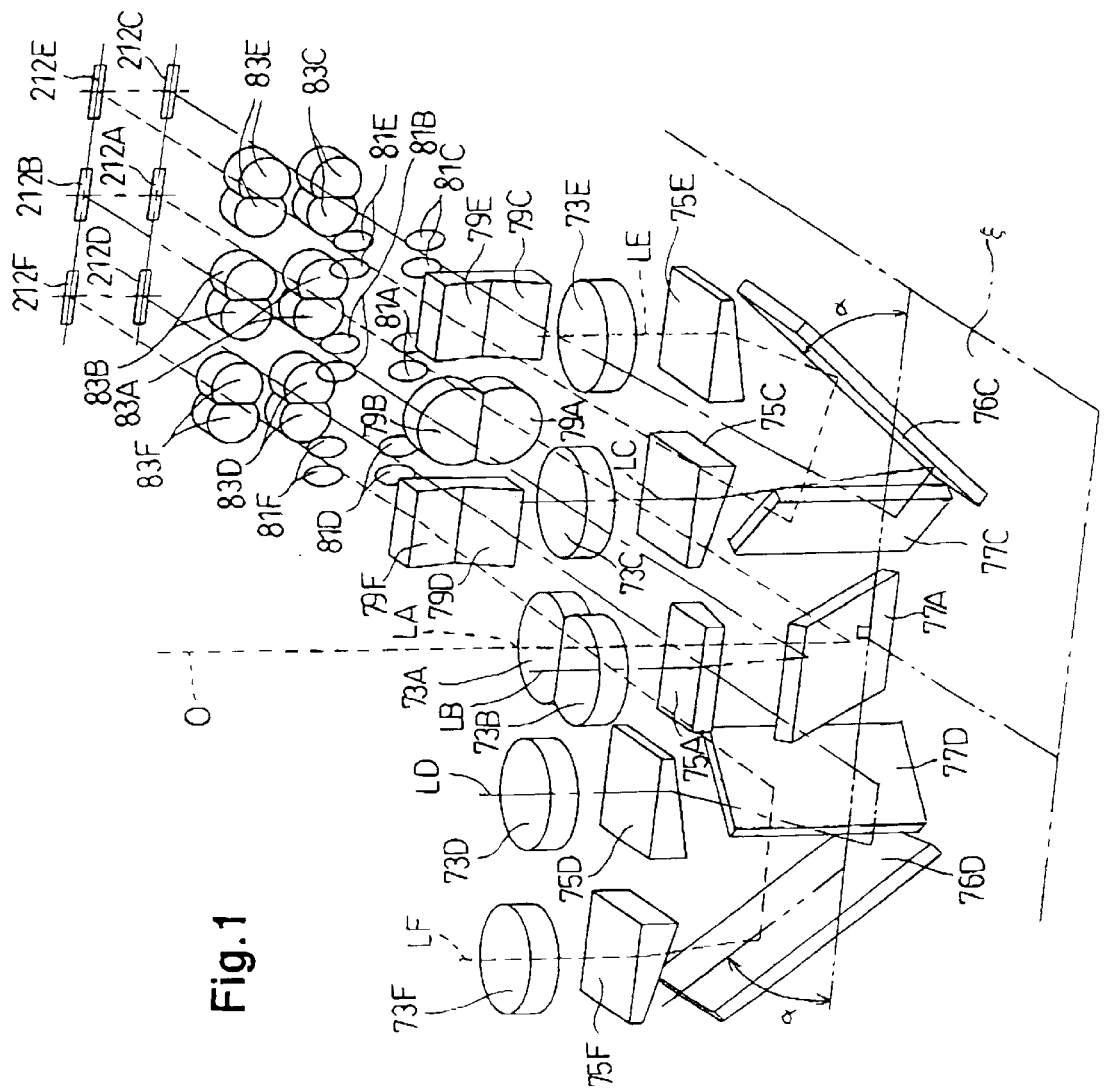
FIG. 1 is a schematic perspective view of the first embodiment of an optical system of a multipoint focus detecting apparatus according to the present invention.
Figure 3:
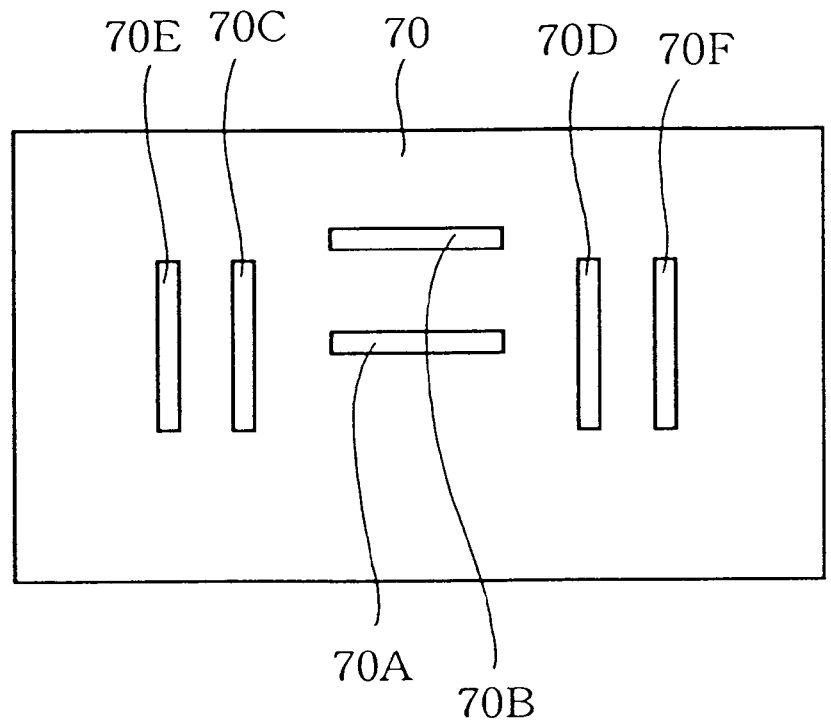
FIG. 3 is a plan view of an image plane on which a plurality of focus detection zones are arranged, showing the arranging pattern thereof.

FIG. 1 shows the first embodiment of the multipoint AF sensor unit 21, and FIG. 3 shows an embodiment of an arrangement pattern of the six focus detection zones. In this embodiment the six focus detection zones 70A, 70B, 70C, 70D, 70E and 70F are arranged across an image plane 70, i.e., the focusing screen of the camera body 11. The multipoint AF sensor unit 21 is provided with six CCD line sensors 212A, 212B, 212C, 212D, 212E and 212F corresponding to the six focus detection zones 70A, 70B, 70C, 70D, 70E and 70F, respectively.

The central focus detection zone 70A is a horizontally-elongated zone positioned at a substantially center of the image plane 70. The upper-central focus detection zone 70B is a horizontally-elongated zone positioned above the central focus detection zone 70A. The central focus detection zone 70A and the upper-central focus detection zone 70B are substantially parallel to each other.

The left focus detection zone 70C and the right focus detection zone 70D are vertically-elongated zones and are positioned on respective sides of the central and upper-central focus detection zones 70A and 70B. The leftmost focus detection zone 70E is a vertically-elongated zone and is positioned on the left side of the left focus detection zone 70C as viewed in FIG. 3, and the rightmost focus detection zone 70F is also a vertically-elongated zone and is positioned on the right side of the right focus detection zone 70D as viewed in FIG. 3. The vertically-elongated focus detection zones 70C, 70D, 70E and 70F are substantially parallel to each other.

The arrangement pattern of the six line sensors 212A through 212F is different from the arrangement pattern of the six focus detection zones 70A, 70B, 70C, 70D, 70E and 70F (see FIGS. 1 and 3). The six line sensors 212A through 212F are arranged as shown in FIG. 1 such that three line sensors (212A, 212C and 212D) are arranged at regular intervals along a lower line while the remaining three line sensors (212B, 212E and 212F) are arranged at the same regular intervals along an upper line positioned above and parallel to the lower line. In the upper line, as viewed in FIG. 1, the line sensor 212F which corresponds to the rightmost focus detection zone 70F is positioned on the left side of the central line sensor 212B which corresponds to the upper-central focus detection zone 70B, and the line sensor 212E which corresponds to the leftmost focus detection zone 70E is positioned on the right side of the central line sensor 212B.

In the lower line, as viewed in FIG. 1, the line sensor 212D which corresponds to the right focus detection zone 70D is positioned on the left side of the central line sensor 212A which corresponds to the central focus detection zone 70A, and the line sensor 212C which corresponds to the left focus detection zone 70C is positioned on the right side of the central line sensor 212A. All the six line sensors 212A through 212F are fixed on a common circuit board.

Figure 4:
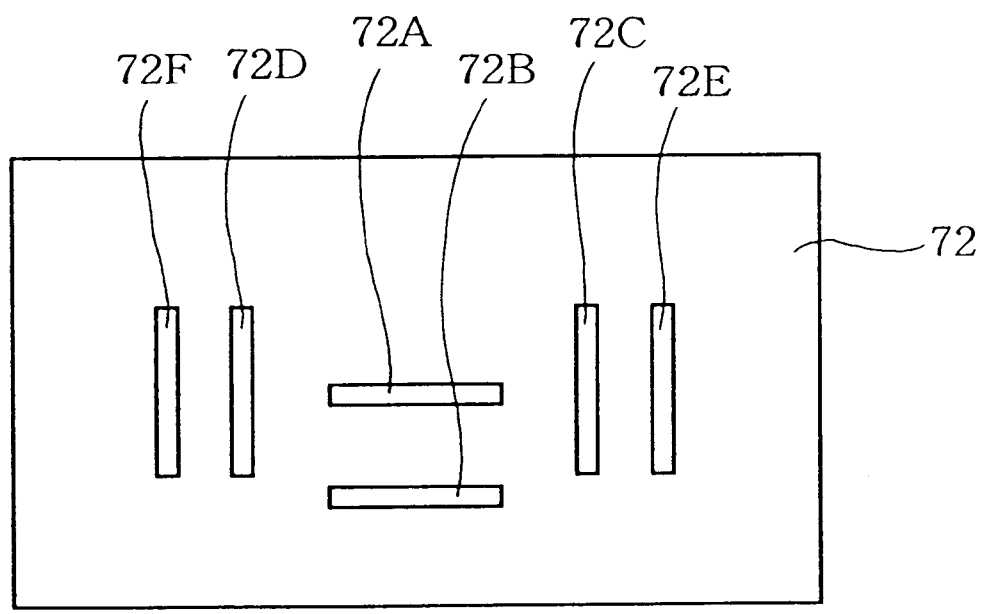
FIG. 4 is a plan view of a cover provided thereon with a plurality of slots corresponding to the plurality of focus detection zones shown in FIG. 3.

The multifocus detection sensor unit 21 is provided with an opaque cover (focus detection zone determining plate) 72 in the vicinity of a predetermined focal plane (located at a position equivalent with a film surface) on which a primary image of an object which is to be photographed is formed by the photographing lens 51. The cover 72 is provided with six rectangular slots 72A, 72B, 72C, 72D, 72E and 72F for extracting six object images corresponding to the six focus detection zones 70A through 70F. FIG. 4 shows a plan view of the cover 72 as viewed from above the camera body 11 (viewed in a vertical direction in FIG. 5). The top and bottom sides of the cover 72 as viewed in FIG. 4 correspond to the rear and front sides of the cover 72, respectively.

The slots 72A through 72F are shaped and arranged to correspond to the focus detection zones 70A through 70F, respectively, so that each of the slots 72A through 72F determines the corresponding focus detection zones 70A, 70B, 70C, 70D, 70E or 70F. Namely, the six light beams which are passed through the slots 72A through 72F are made incident on the six line sensors 212A through 212F to form the six object images corresponding to the six focus detection zones 70A through 70F on the six line sensors 212A through 212F, respectively, which makes it possible to detect a focus state (defocus amount) for each of the six focus detection zones 70A through 70F.

Note that the light beams described herein which pass through the centers of the detection zones 70A, 70B, 70C, 70D, 70E or 70F represent the principal rays thereof. One side from which a light beam comes toward an optical element is herein termed "the front of the member", while another side toward which a light beam goes away from the optical member is herein called "behind the member".

Six condenser lenses 73A, 73B, 73C, 73D, 73E and 73F are positioned behind the cover 72 to correspond to the six slots 72A, 72B, 72C, 72D, 72E and 72F, respectively. Five prisms 75A, 75C, 75D, 75E and 75F for deflecting light paths are positioned behind the six condenser lenses 73A, 73B, 73C, 73D, 73E and 73F. Five mirrors 76C, 76D, 77A, 77C and 77D are positioned behind the five prisms 75A, 75C, 75D, 75E and 75F.

First, the optical systems for the two light beams which are respectively passed through the central and upper-central focus detection zones 70A and 70B will be hereinafter discussed. The prism 75A provided as a deflector is positioned behind the condenser lens 73B. A central light beam LA, which passes through the focus detection zone 70A and the condenser lens 73A, passes beside, but not through, the prism 75A. An upper-central light beam LB, which passes through the focus detection zone 70B and the condenser lens 73B, is deflected by the prism 75A in a direction to decrease the distance between the central light beam LA and the upper-central light beam LB. Subsequently, the central light beam LA and the upper-central light beam LB (which is passed through the prism 75A) are each deflected by the central mirror 77A by approximately 90 degrees to proceed towards the line sensors 212A and 212B, respectively. In this illustrated embodiment, the primary light ray of the central light beam LA is coincident with the optical axis O of the photographic lens 51.

The central and upper-central light beams LA and LB reflected by the central mirror 77A pass through prisms 79A and 79B, respectively. The prisms 79A and 79B deflect the light paths of the central and upper-central light beams LA and LB, respectively, to adjust the distance between the two light paths. Subsequently, the central light beam LA which is passed through the prism 79A is split into two beams by a pair of lenses 83A to be incident upon the line sensor 212A, so that a pair of object images, which are separated from each other by a distance corresponding to the object distance, is formed on the line sensor 212A. At the same time, the upper-central light beam LB which is passed through the prism 79B is split into two beams by a pair of lenses 83B to be incident upon the line sensor 212B so that a pair of object images, which are separated from each other by a distance corresponding to the object distance, is formed on the line sensor 212B. Reference designators 81A and 81B designate pairs of openings which are formed on a separator mask. The separator mask is positioned between the prisms 79A through 79F and the prisms 83A through 83F.

Each of the line sensors 212A through 212F includes an array of photodiodes. Each photodiode accumulates (integrates) an electric charge in accordance with the brightness of the object image formed on the photodiode. The accumulated electric charges are read out of the photodiodes by a conventional drive circuit and is converted into a video signal by a signal processing circuit. This video signal is input to the CPU 35. The CPU 35 determines a distance (phase difference) between a pair of object images formed on each of the line sensors 212A through 212F, using an algorithm according to a phase difference detecting method; and subsequently, the CPU 35 calculates a defocus amount using the determined distance (phase difference) to determine and calculate the rotational direction and the number of revolutions of the AF motor 39 (i.e., the number of pulses to be output from an encoder 41) necessary for moving the AF lens group 53 to an in-focus position thereof.

Secondly, the optical systems for the two light beams which are respectively passed through the left and leftmost focus detection zones 70C and 70E will be hereinafter discussed. The prism 75C provided as a deflector is positioned behind the condenser lens 73C. A left light beam LC which is passed through the left focus detection zone 70C and the condenser lens 73C is deflected by the prism 75C in a direction away from the central light beam LA (i.e., in a direction to the right as viewed in FIG. 1) to be incident on the first left mirror 76C. Subsequently, the left light beam LC is reflected by the first left mirror 76C to be incident on the second left mirror 77C and is reflected thereby to proceed towards the line sensor 212C.

On the other hand, the prism 75E provided as a deflector is positioned behind the condenser lens 73E. A leftmost light beam LE which is passed through the leftmost focus detection zone 70E and the condenser lens 73E is deflected by the prism 75E in a direction to approach the left light beam LC to be incident on the first left mirror 76C. Subsequently, the leftmost light beam LE is reflected by the first left mirror 76C to be incident on the second left mirror 77C and is reflected thereby to proceed towards the line sensor 212E.

The first left mirror 76C is positioned at an angle relative to a predetermined focal plane (or a plane ξ which extends parallel to the predetermined focal plane) by an angle a shown in FIG. 1. The angle a is set to an angle greater than 45 degrees, and equal to or less than 70 degrees. In a conventional multipoint focus detecting apparatus, a mirror corresponding to the first left mirror 76C is angled relative to a predetermined focal plane by an angle of 45 degrees, whereas in the present embodiment the first left mirror 76C is angled relative to the predetermined focal plane by an angle greater than 45 degrees.

The left and leftmost light beams LC and LE reflected by the second left mirror 77C pass through prisms 79C and 79E, respectively. The prisms 79C and 79E deflect the light paths of the left and leftmost light beams LC and LE, respectively, to adjust the distance between the two light paths. Subsequently, the left light beam LC which is passed through the prism 79C is split into two beams by a pair of lenses 83C to be incident upon the line sensor 212C, so that a pair of object images, which are separated from each other by a distance corresponding to the object distance, is formed on the line sensor 212C. At the same time, the leftmost light beam LE which is passed through the prism 79E is split into two beams by a pair of lenses 83E to be incident upon the line sensor 212E, so that a pair of object images, which are separated from each other, by a distance corresponding to the object distance is formed on the line sensor 212E. Reference designators 81C and 81E designate pairs of openings which are formed on the separator mask.

Thirdly, the optical systems for the two light beams which are respectively passed through the right and rightmost focus detection zones 70D and 70F will be hereinafter discussed. Note that the optical systems for the two light beams which are respectively passed through the right and rightmost focus detection zones 70D and 70F and the optical systems for the two light beams which are respectively passed through the left and leftmost focus detection zones 70C and 70E are arranged symmetrically with respect to a plane including the optical axis O shown in FIG. 1.

The prism 75D provided as a deflector is positioned behind the condenser lens 73D. A right light beam LD which is passed through the right focus detection zone 70D and the condenser lens 73D is deflected by the prism 75D in a direction away from the central light beam LA (i.e., in a direction to the left as viewed in FIG. 1) to be incident on the first right mirror 76D. Subsequently, the right light beam LD is reflected by the first right mirror 76D to be incident on the second right mirror 77D and is reflected thereby to proceed towards the line sensor 212D.

On the other hand, the prism 75F provided as a deflector is positioned behind the condenser lens 73F. A rightmost light beam LF which is passed through the rightmost focus detection zone 70F and the condenser lens 73F is deflected by the prism 75F in a direction to approach the right light beam LD to be incident on the first right mirror 76D. Subsequently, the rightmost light beam LF is reflected by the first right mirror 76D to be incident on the second right mirror 77D and is reflected thereby to proceed towards the line sensor 212F.

The first right mirror 76D is positioned at an angle relative to the predetermined focal plane (or the plane ξ which extends parallel to the predetermined focal plane) by an angle α shown in FIG. 1. The angle α is set to an angle greater than 45 degrees, and equal to or less than 70 degrees. In a conventional multipoint focus detecting apparatus, a mirror corresponding to the first right mirror 76D is angled relative to a predetermined focal plane by an angle of 45 degrees, whereas in the present embodiment the first right mirror 76D is angled relative to the predetermined focal plane by an angle of over 45 degrees.

The right and rightmost light beams LD and LF reflected by the second right mirror 77D pass through prisms 79D and 79F, respectively. The prisms 79D and 79F deflect the light paths of the right and rightmost light beams LD and LF, respectively, to adjust the distance between the two light paths. Subsequently, the right light beam LD which is passed through the prism 79D is split into two beams by a pair of lenses 83D to be incident upon the line sensor 212D, so that a pair of object images, which are separated from each other by a distance corresponding to the object distance, is formed on the line sensor 212D. At the same time, the rightmost light beam LF which is passed through the prism 79F is split into two beams by a pair of lenses 83F to be incident upon the line sensor 212F, so that a pair of object images, which are separated from each other by a distance corresponding to the object distance, is formed on the line sensor 212F. Reference designators 81D and 81F designate pairs of openings which are formed on the separator mask.

According to the first embodiment having the aforementioned structure, since the first left mirror 76C and the first right mirror 76D is angled relative to the predetermined focal plane by an angle α of over 45 degrees, the second left mirror 77C and the second right mirror 77D can be positioned sufficiently away from the prism 75C and the prism 75D to eliminate the possibility of the left light beam LC and the right light beam LD, which are passed through the prism 75C and the prism 75D, being intercepted by the second left mirror 77C and the second right mirror 77D, respectively.

Furthermore, the left and leftmost light beams LC and LE are incident on the first left mirror 76C at respective lower positions thereon which are positioned sufficiently apart from each other, so that the left and leftmost light beams LC and LE reflected by the first left mirror 76C can be easily separated from each other. This makes it easy to arrange the optical elements independently of one another (which are positioned behind the second left mirror 77C and through which the left and leftmost light beams LC and LE pass) without causing the left and leftmost light beams LC and LE to intercept with each other. Likewise, the right and rightmost light beams LD and LF are incident on the first right mirror 76D at respective lower positions thereon which are sufficiently apart from each other, so that the right and rightmost light beams LD and LF reflected by the first right mirror 76D can be easily separated from each other. This makes it easy to arrange the optical elements independently of one another (which are positioned behind the second right mirror 77D and through which the right and rightmost light beams LD and LF pass) without causing the right and rightmost light beams LD and LF to intercept with each other.

As can be understood from the above, the first embodiment of the multipoint focus detecting apparatus is provided with the first and second focus detecting zones arranged in a first predetermined pattern on a predetermined focal plane around the center thereof, wherein corresponding first and second light receiving elements are arranged in a second predetermined pattern that is different from the first predetermined pattern. The corresponding first and second light beams which are passed through the first and second focus detecting zones are reflected by two reflecting members to be incident on the corresponding first and second light receiving elements, respectively, and the first reflecting member is positioned at an angle relative to the predetermined focal plane by an angle of more than 45 degrees or equal to or less than 70 degrees. This structure eliminates the possibility of any light beams being intercepted by a reflecting member, so that a degree of freedom of arranging the optical elements of the multipoint focus detecting apparatus is more extensive.

Figure 2:
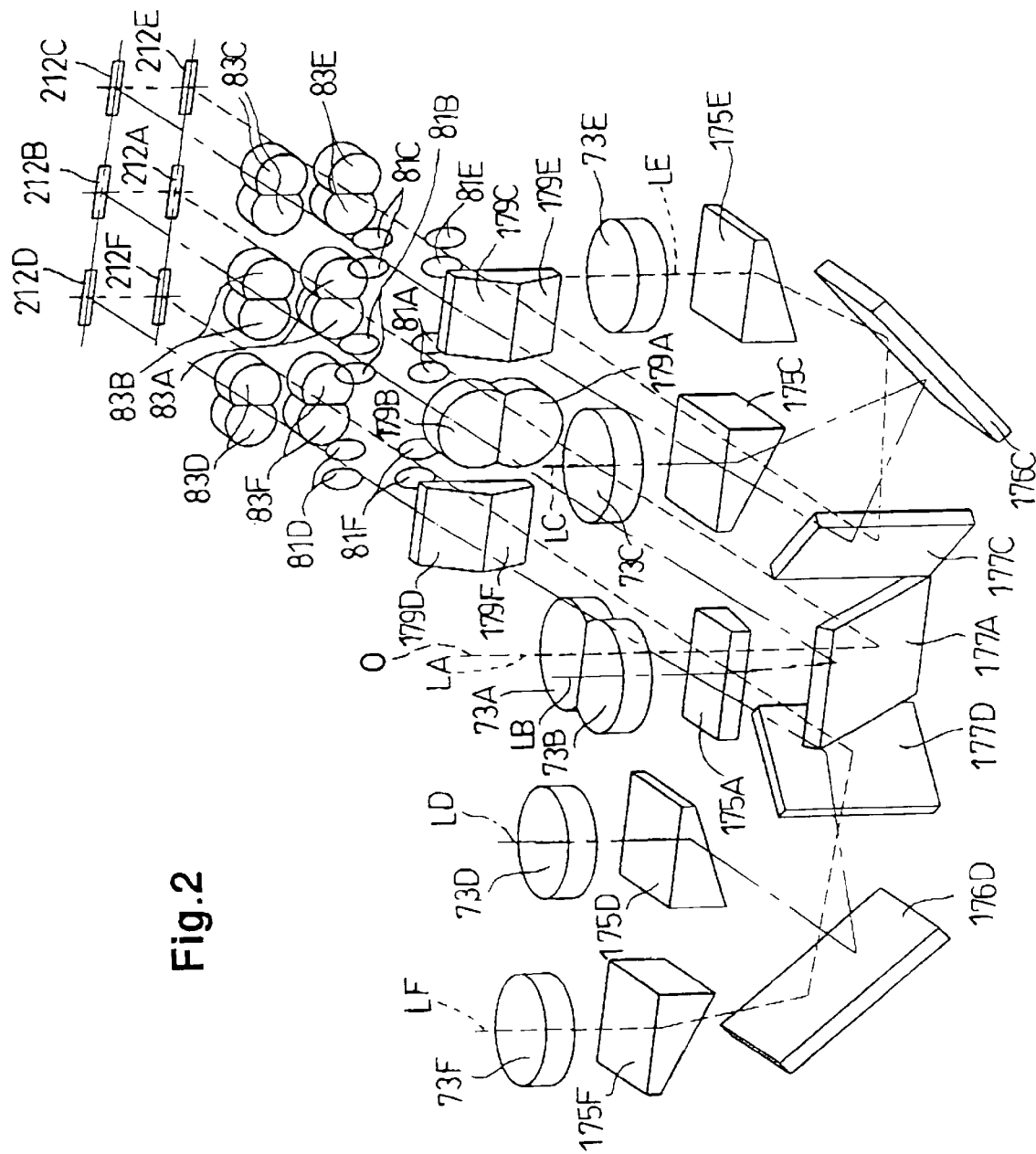
FIG. 2 is a schematic perspective view of the second embodiment of an optical system of a multipoint focus detecting apparatus according to the present invention.

FIG. 2 shows the second embodiment of the multipoint AF sensor unit 21. In FIG. 2, members or elements which are similar to those shown in FIG. 1 are designated by the same reference designators.

First, the optical systems for the two light beams which are respectively passed through the central and upper-central focus detection zones 70A and 70B will be hereinafter discussed. The prism 175A provided as a deflector is positioned behind the condenser lens 73B. A central light beam LA, which passes through the focus detection zone 70A and the condenser lens 73A, passes beside, but not through, the prism 175A. An upper-central light beam LB which is passed through the focus detection zone 70B and the condenser lens 73B is deflected by the prism 175A in a direction to decrease the distance between the central light beam LA and the upper-central light beam LB. Subsequently, the central light beam LA and the upper-central light beam LB (which is passed through the prism 175A) are each deflected by the central mirror 177A by approximately 90 degrees to proceed towards the line sensors 212A and 212B, respectively.

The central and upper-central light beams LA and LB reflected by the central mirror 177A pass through prisms 179A and 179B, respectively. The prisms 179A and 179B deflect the light paths of the central and upper-central light beams LA and LB, respectively, to adjust the distance between the two light paths. Subsequently, the central light beam LA which is passed through the prism 179A is split into two beams by a pair of lenses 83A to be incident upon the line sensor 212A, so that a pair of object images, which are separated from each other by a distance corresponding to the object distance, is formed on the line sensor 212A. At the same time, the upper-central light beam LB which is passed through the prism 179B is split into two beams by a pair of lenses 83B to be incident upon the line sensor 212B, so that a pair of object images, which are separated from each other by a distance corresponding to the object distance, is formed on the line sensor 212B. Reference designators 81A and 81B designate pairs of openings which are formed on a separator mask. The separator mask is positioned between the prisms 179A through 179F and the prisms 83A through 83F.

Each of the line sensors 212A through 212F includes an array of photodiodes. Each photodiode accumulates (integrates) an electric charge in accordance with the brightness of the object image formed on the photodiode. The accumulated electric charges are read out of the photodiodes by a conventional drive circuit to be converted into a video signal by a signal processing circuit. This video signal is input to the CPU 35. The CPU 35 determines a distance (phase difference) between a pair of object images formed on each of the line sensors 212A through 212F, using an algorithm according to a phase difference detecting method; and subsequently, the CPU 35 calculates a defocus amount using the determined distance (phase difference) to determine and calculate the rotational direction and the number of revolutions of the AF motor 39 (i.e., the number of pulses to be output from an encoder 41) necessary for moving the AF lens group 53 to an in-focus position thereof.

Secondly, the optical systems for the two light beams which are respectively passed through the left and leftmost focus detection zones 70C and 70E will be hereinafter discussed. The prism 175C provided as a deflector is positioned behind the condenser lens 73C. A left light beam LC which is passed through the left focus detection zone 70C and the condenser lens 73C is deflected by the prism 175C in a direction away from the central light beam LA (i.e., in a direction to the right as viewed in FIG. 2) to be incident on the first left mirror 176C. Subsequently, the left light beam LC is reflected by the first left mirror 176C to be incident on the second left mirror 177C and is reflected thereby to proceed towards the line sensor 212C.

On the other hand, the prism 175E provided as a deflector is positioned behind the condenser lens 73E. A leftmost light beam LE which is passed through the leftmost focus detection zone 70E and the condenser lens 73E is deflected by the prism 175E in a direction to approach the left light beam LC to be incident on the first left mirror 176C. Subsequently, the leftmost light beam LE is reflected by the first left mirror 176C to be incident on the second left mirror 177C and is reflected thereby to proceed towards the line sensor 212E.

The light beams LC and LE reflected by the first left mirror 176C intersect each other between the first left mirror 176C and the second left mirror 177C, so that the incident position of the light beam LC is above the incident position of the light beam LE on the second left mirror 177C whereas the incident position of the light beam LC is below the incident position of the light beam LE on the first left mirror 176C.

The left and leftmost light beams LC and LE reflected by the second left mirror 177C pass through prisms 179C and 179E, respectively. The prisms 179C and 179E deflect the light paths of the left and leftmost light beams LC and LE, respectively, to adjust the distance between the two light paths. Subsequently, the left light beam LC which is passed through the prism 179C is split into two beams by a pair of lenses 83C to be incident upon the line sensor 212C, so that a pair of object images, which are separated from each other by a distance corresponding to the object distance, is formed on the line sensor 212C. At the same time, the leftmost light beam LE which is passed through the prism 179E is split into two beams by a pair of lenses 83E to be incident upon the line sensor 212E, so that a pair of object images, which are separated from each other by a distance corresponding to the object distance, is formed on the line sensor 212E. Reference designators 81C and 81E designate pairs of openings which are formed on the separator mask.

Thirdly, the optical systems for the two light beams which are respectively passed through the right and rightmost focus detection zones 70D and 70F will be hereinafter discussed. Note that the optical systems for the two light beams which are respectively passed through the right and rightmost focus detection zones 70D and 70F and the optical systems for the two light beams which are respectively passed through the left and leftmost focus detection zones 70C and 70E are arranged symmetrically with respect to a plane including the optical axis O shown in FIG. 2.

The prism 175D provided as a deflector is positioned behind the condenser lens 73D. A right light beam LD which is passed through the right focus detection zone 70D and the condenser lens 73D is deflected by the prism 175D in a direction away from the central light beam LA (i.e., in a direction to the left as viewed in FIG. 2) to be incident on the first right mirror 176D. Subsequently, the right light beam LD is reflected by the first right mirror 176D to be incident on the second right mirror 177D and is reflected thereby to proceed towards the line sensor 212D.

On the other hand, the prism 175F provided as a deflector is positioned behind the condenser lens 73F. A rightmost light beam LF which is passed through the rightmost focus detection zone 70F and the condenser lens 73F is deflected by the prism 175F in a direction to approach the right light beam LD to be incident on the first right mirror 176D. Subsequently, the rightmost light beam LF is reflected by the first right mirror 176D to be incident on the second right mirror 177D and is reflected thereby to proceed towards the line sensor 212F.

The light beams LD and LF reflected by the first right mirror 176D intersect each other between the first right mirror 176D and the second right mirror 177D, so that the incident position of the light beam LD is above the incident position of the light beam LF on the second right mirror 177D, whereas the incident position of the light beam LD is below the incident position of the light beam LF on the first right mirror 176D.

The right and rightmost light beams LD and LF reflected by the second right mirror 177D pass through prisms 179D and 179F, respectively. The prisms 179D and 179F deflect the light paths of the right and rightmost light beams LD and LF, respectively, to adjust the distance between the two light paths. Subsequently, the right light beam LD which is passed through the prism 179D is split into two beams by a pair of lenses 83D to be incident upon the line sensor 212D, so that a pair of object images, which are separated from each other by a distance corresponding to the object distance, is formed on the line sensor 212D. At the same time, the rightmost light beam LF which is passed through the prism 179F is split into two beams by a pair of lenses 83F to be incident upon the line sensor 212F, so that a pair of object images, which are separated from each other by a distance corresponding to the object distance, is formed on the line sensor 212F. Reference designators 81D and 81F designate pairs of openings which are formed on the separator mask.

According to the second embodiment having the aforementioned structure, since the light beams LC and LE reflected by the first left mirror 176C intersect each other between the first left mirror 176C and the second left mirror 177C while the light beams LD and LF reflected by the first right mirror 176D intersect each other between the first right mirror 176D and the second right mirror 177D, the incident positions of the light beams LC and LE are close to each other on each of the first and second left mirrors 176C and 177C while the incident positions of the light beams LD and LF are close to each other on each of the first and second right mirrors 176D and 177D. At the same time, the left and leftmost light beams LC and LE reflected by the first left mirror 176C are incident on the second left mirror 177C at respective lower positions thereon while the right and rightmost light beams LF and LD reflected by the first right mirror 176D are incident on the second right mirror 177D at respective lower positions thereon. Namely, the incident positions of the left and leftmost light beams LC and LE on the second left mirror 177C are separated from the corresponding focus detection zones 70C and 70E, while the incident positions of the right and rightmost light beams LF and LD on the second right mirror 177D are separated from the corresponding focus detection zones 70F and 70D, by amounts sufficient that the dimensions and/or the area of the light receiving surface of each of the mirrors 176C, 176D, 177C and 177D can be reduced. Therefore, the possibility of the left light beam LC and the leftmost light beam LE being intercepted by the first left mirror 176C and the second left mirror 177C can be eliminated, and the possibility of the right light beam LD and the rightmost light beam LF being intercepted by the first right mirror 176D and the second right mirror 177D can also be eliminated. Furthermore, since the left and leftmost light beams LC and LE reflected by the first left mirror 176C are separated from each other by a sufficient amount after intersecting each other, it is easy to arrange the optical elements which are positioned behind the second left mirror 177C and through which the left and leftmost light beams LC and LE pass, without causing the left and leftmost light beams LC and LE to intercept with each other. Likewise, since the right and rightmost light beams LD and LF reflected by the first right mirror 176D are separated from each other after intersecting each other by a sufficient amount, it is easy to arrange the optical elements which are positioned behind the second right mirror 177D and through which the right and rightmost light beams LD and LF pass, without causing the right and rightmost light beams LD and LF to intercept with each other.

In the second embodiment, although the light beams LC and LE reflected by the first left mirror 176C intersect each other between the first left mirror 176C and the second left mirror 177C and the light beams LD and LF reflected by the first right mirror 176D intersect each other between the first right mirror 176D and the second right mirror 177D, this arrangement is not limited solely thereto. Namely, the light beams LC and LE reflected by the first left mirror 176C can be made to intersect each other in front of the first left mirror 176C, above the first left mirror 176C, in front of the second left mirror 177C, or behind the second left mirror 177C. Likewise, the light beams LD and LF reflected by the first right mirror 176D can be made to intersect each other in front of the first right mirror 176D, above the first right mirror 176D, in front of the second right mirror 177D, or behind the second right mirror 177D.

In each of the first and second embodiments, although five peripheral focus detection zones (i.e., the upper-central focus detection zone 70B, the left focus detection zone 70C, the leftmost focus detection zone 70E, the right focus detection zone 70E and the rightmost focus detection zone 70F) are arranged around the central focus detection zone 70A, this arrangement, shape and size, is not limited solely thereto. For instance, one or more than one focus detection zone can be added between the central focus detection zone 70A and the left focus detection zone 70C and/or between the central focus detection zone 70A and the right focus detection zone 70D. Likewise, one or more than one focus detection zone can be added outside the leftmost focus detection zone 70E (on the left side of the leftmost focus detection zone 70E as viewed in FIG. 3) and/or outside the rightmost focus detection zone 70F (on the right side of the rightmost focus detection zone 70F as viewed in FIG. 3). Furthermore, the upper-central focus detection zone 70B and the associated optical elements can be omitted.

As can be understood from the foregoing, the second embodiment of the multipoint focus detecting apparatus is provided with the first and second focus detecting zones arranged in a first predetermined pattern on a predetermined focal plane around the center thereof, wherein corresponding first and second light beams which are passed through the first and second focus detecting zones are reflected by two reflecting members to be incident on the corresponding first and second light receiving elements, respectively. The first and second light beams reflected by the first reflecting member intersect each other between the first reflecting member and the first and second light receiving elements, so that the incident positions of the first and second light beams are close to each other on each of the first and second reflecting members. Accordingly, the dimensions and/or the area of the light receiving surface of each of the first and second reflecting members can be reduced. Therefore, a possibility of the first and second light beams being intercepted by the first and second reflecting members can be eliminated. Furthermore, since the first and second light beams reflected by the first reflecting member are separated from each other by a sufficient amount after intersecting each other, it is easy to arrange the optical elements which are positioned behind the second reflecting member and through which the first and second light beams pass, without causing the first and second light beams to intercept with each other.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A multipoint focus detecting apparatus having a plurality of focus detecting zones arranged in a first pattern on a predetermined focal plane around the center thereof, and a corresponding plurality of light receiving elements arranged in a second pattern that is different from said first pattern, a corresponding plurality of light beams which are passed through said plurality of focus detecting zones being made incident on said plurality of light receiving elements, respectively;

wherein said plurality of focus detecting zones comprises a first focus detecting zone and a second focus detecting zone positioned, on the same side as said first focusing detecting zone, farther from said center of said predetermined focal plane than said first focus detecting zone;

wherein said multipoint focus detecting apparatus comprises: a first reflecting member for reflecting a first light beam and a second light beam which are respectively passed through said first focus detecting zone and said second focus detecting zone in directions towards an approximate center of said predetermined focal plane; and a second reflecting member for reflecting said first and second light beams reflected by said first reflecting member towards corresponding one and another of said plurality of light receiving elements, respectively, and wherein said first reflecting member is positioned at an angle relative to said predetermined focal plane by an angle of more than 45 degrees, and equal to or less than 70 degrees.

2. The multipoint focus detecting apparatus according to claim 1, further comprising at least one deflection optical member for deflecting said first light beam and said second light beam, which are respectively passed through said first focus detecting zone and said second focus detecting zone, to be incident on said first reflecting member.

3. The multipoint focus detecting apparatus according to claim 2, wherein said at least one deflection member comprises a first deflection optical member for deflecting said first light beam, which is passed through said first focus detecting zone, in a direction to approach said second light beam, which is passed through said second focus detecting zone, to be incident on said first reflecting member; and wherein said at least one deflection member comprises a second deflection optical member for deflecting said second light beam, which is passed through said second focus detecting zone, in a direction to approach said first light beam, which is passed through said first focus detecting zone, to be incident on said first reflecting member.

4. The multipoint focus detecting apparatus according to claim 1, further comprising a horizontally-elongated central focus detecting zone which is positioned over said center of said predetermined focal plane;

wherein said first focus detecting zone comprises right and left detecting zones positioned on the right and left sides of said central focus detecting zone; and wherein said second focus detecting zone comprises rightmost and leftmost detecting zones positioned on the right side of said right focus detecting zone and the left side of said left focus detecting zone, respectively.

5. The multipoint focus detecting apparatus according to claim 4, wherein said first focus detecting zone and said second focus detecting zone are provided symmetrically at left and right positions with respect to said central focus detecting zone.

6. The multipoint focus detecting apparatus according to claim 3, further comprising a first condenser lens positioned between said predetermined focal plane and said first deflection optical member, and a second condenser lens positioned between said predetermined focal plane and said second deflection optical member.

7. The multipoint focus detecting apparatus according to claim 3, wherein each of said first and second deflection optical members comprises a prism.

8. The multipoint focus detecting apparatus according to claim 1, wherein each of said plurality of light receiving elements comprises an array of light receiving elements.

9. The multipoint focus detecting apparatus according to claim 1; wherein said multipoint focus detecting apparatus is incorporated in an SLR camera.

10. A multipoint focus detecting apparatus having a plurality of focus detecting zones arranged in a first pattern on a predetermined focal plane around the center thereof, and a corresponding plurality of light receiving elements arranged in a second pattern that is different from said first pattern, a corresponding plurality of light beams which are passed through said plurality of focus detecting zones being made incident on said plurality of light receiving elements, respectively;

wherein said plurality of focus detecting zones comprises a first focus detecting zone and a second focus detecting zone positioned, on the same side as said first focusing detecting zone, farther from said center of said predetermined focal plane than said first focus detecting zone;

wherein said multipoint focus detecting apparatus comprises: a first reflecting member for reflecting a first light beam and a second light beam which are respectively passed through said first focus detecting zone and said second focus detecting zone in directions towards an approximate center of said predetermined focal plane; and a second reflecting member for reflecting said first and second light beams reflected by said first reflecting member towards corresponding one and another of said plurality of light receiving elements, respectively; and wherein said first and second light beams reflected by said first reflecting member intersect each other between said first reflecting member, and said one and another of said plurality of light receiving elements.

11. The multipoint focus detecting apparatus according to claim 10, further comprising at least one deflection optical member for deflecting said first light beam and said second light beam, which are respectively passed through said first focus detecting zone and said second focus detecting zone, to be incident on said first reflecting member.

12. The multipoint focus detecting apparatus according to claim 11, wherein said at least one deflection optical member is positioned so that said first and second light beams reflected by said first reflecting member intersect each other to be subsequently incident on said second reflecting member.

13. The multipoint focus detecting apparatus according to claim 12, wherein said at least one deflection member comprises a first deflection optical member for deflecting said first light beam, which is passed through said first focus detecting zone, in a direction to approach said second light beam, which is passed through said second focus detecting zone, to be incident on said first reflecting member; and wherein said at least one deflection member comprises a second deflection optical member for deflecting said second light beam, which is passed through said second focus detecting zone, in a direction to approach said first light beam, which is passed through said first focus detecting zone, to be incident on said first reflecting member.

14. The multipoint focus detecting apparatus according to claim 10, further comprising a central focus detecting zone which is positioned over said center of said predetermined focal plane;

wherein said first focus detecting zone comprises right and left detecting zones positioned on the right and left sides of said central focus detecting zone; and wherein said second focus detecting zone comprises rightmost and leftmost detecting zones positioned on the right side of said right focus detecting zone and the left side of said left focus detecting zone, respectively.

15. The multipoint focus detecting apparatus according to claim 14, wherein said first focus detecting zone and said second focus detecting zone are provided symmetrically at left and right positions with respect to said central focus detecting zone.

16. The multipoint focus detecting apparatus according to claim 13, further comprising a first condenser lens positioned between said predetermined focal plane and said first deflection optical member and a second condenser lens positioned between said predetermined focal plane and said second deflection optical member.

17. The multipoint focus detecting apparatus according to claim 13, wherein each of said first and second deflection optical members comprises a prism.

18. The multipoint focus detecting apparatus according to claim 10, wherein each of said plurality of light receiving elements comprises an array of light receiving elements.

19. The multipoint focus detecting apparatus according to claim 10, wherein said multipoint focus detecting apparatus is incorporated in an SLR camera.

* * * * *